April 4, 1967  L. T. MELFI, JR., ETAL  3,312,101
GAS ANALYZER FOR BI-GASEOUS MIXTURES
Filed Nov. 8, 1963  2 Sheets-Sheet 1

INVENTORS
LEONARD T. MELFI, JR.
GEORGE M. WOOD, JR.
PAUL R. YEAGER

BY

*William H. King*
ATTORNEYS

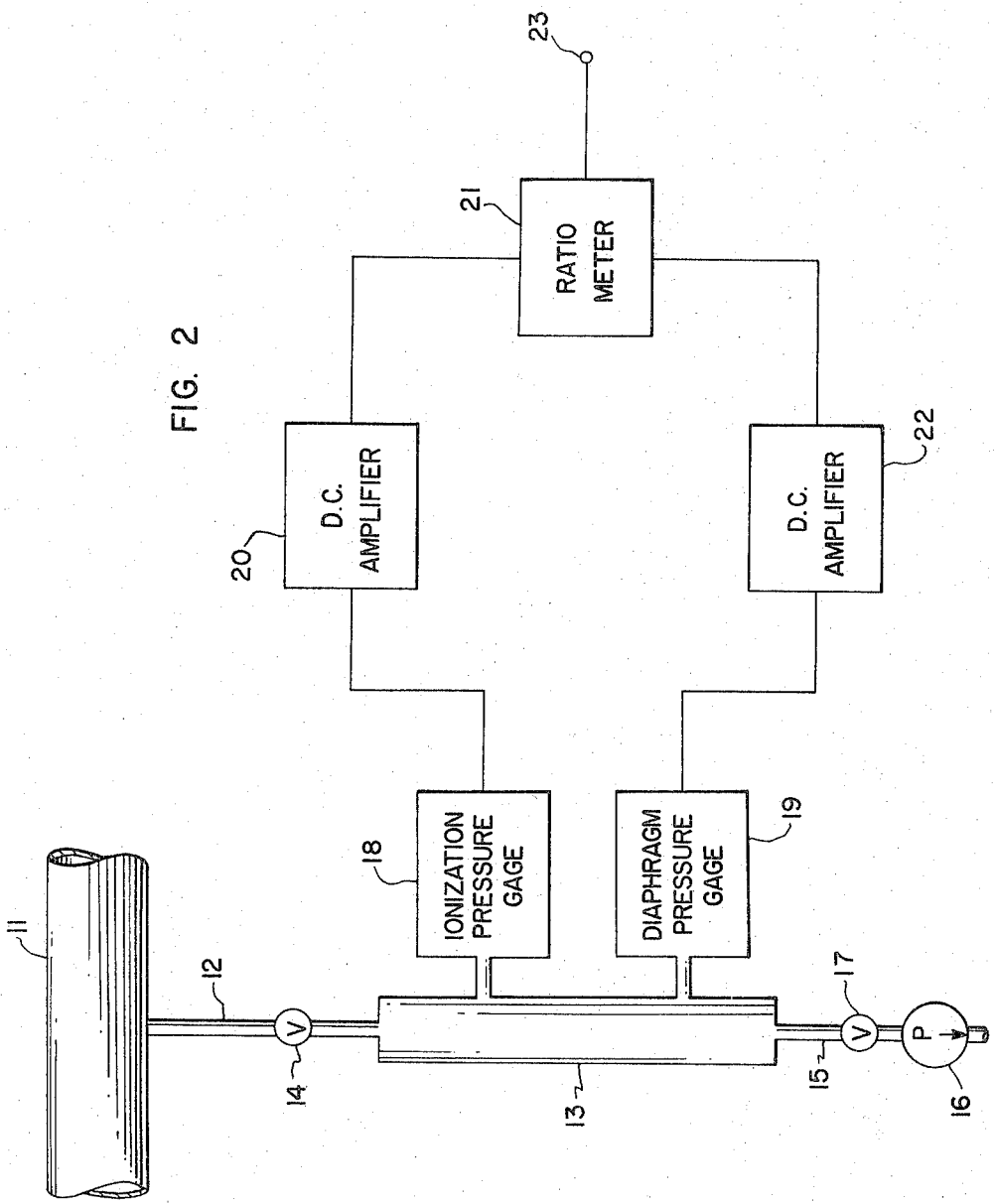

United States Patent Office 3,312,101
Patented Apr. 4, 1967

3,312,101
GAS ANALYZER FOR BI-GASEOUS MIXTURES
Leonard T. Melfi, Jr., Williamsburg, George M. Wood, Jr., Hampton, and Paul R. Yeager, Dare, Va., assignors to the United States of America as represented by the Administrator of the National Aeronautics and Space Administration
Filed Nov. 8, 1963, Ser. No. 322,545
10 Claims. (Cl. 73—23)

The invention described herein may be manufactured and used by or for the Government of the United States of America for governmental purposes without the payment of royalties thereon or therefor.

This invention relates to gas analyzers and more particularly concerns a gas analyzer suitable for use in test facilities where rapid sampling and large amounts of data are required.

In test facilities whose operating costs do not permit extremely long runs, it is sometimes necessary to obtain large amounts of data in short periods of time to obtain gas analyses of the test facilities. In the past, the problem of gas analysis in test facilities has been solved by the use of the many available methods of analyses such as gas chromatography, mass spectrometry, thermal conductivity, and collecting samples in bottles from many points for analysis by mass spectrometry. All of these previously used methods of analyses are incapable of rapid sampling or of acquiring large amounts of data. These capabilities have been sacrificed for high sensitivities and component identification. As a result, an increasing need has been noted for a simplified quantitative instrument capable of quickly sampling data from many sample points for use in test facilities.

The primary purpose of this invention is to provide a simplified gas analyzer capable of rapid sampling and of acquiring large amounts of data. To accomplish this purpose, the inherent difference in the relative ionization of helium and dry air has been utilized as a means of quantitatively measuring the percentage composition of helium in helium-dry air mixtures. Even though this technique has only been used to analyze helium-dry air mixtures, it will find application in facilities requiring analysis of any bi-gaseous mixture in which the two gases in the mixture have a sufficient difference in relative ionization.

It is therefore an object of this invention to provide a gas analyzer suitable for use where rapid sampling and large amounts of data are required.

Another object of this invention is to provide means for quantitatively measuring the percentage composition of helium in helium-dry air mixtures.

A further object of this invention is to provide means for quantitatively measuring the percentage composition of one of the gases in a bi-gaseous mixture.

Still another object of this invention is to provide a simplified quantitative instrument based on the inherent differences in relative ionization of gases for measuring the percentage of one of the gases in a bi-gaseous mixture.

A still further object of this invention is to provide a method based on the inherent differences in relative ionization of gases for measuring the percentage of one of the gases in a bi-gaseous mixture.

Yet another object of this invention is to provide a gas analyzer whose operation is not affected by changes in pressure of the gas being analyzed.

Other objects and advantages of this invention will further become apparent hereinafter and in the drawings, in which:

FIG. 2 is a block diagram of the preferred embodiment of this invention; and

In explaining the theory upon which the gas analyzer, that constitutes this invention, is based, it will be assumed that the bi-gaseous mixture that is to be analyzed consists of dry air and helium. However, it should be realized that any gas or mixture of gases could be used as either of the gases in the bi-gaseous mixture. From Dalton's Law the sum of the partial pressures of an ideal bi-gaseous mixture is equal to the total pressure of the mixture, that is, $$P_t = P_x + P_y \qquad (1)$$

and $$x = \frac{P_x}{P_t};\ y = \frac{P_y}{P_t} \qquad (2)$$

where $P_t$ is the total pressure of the bi-gaseous mixture, $P_x$ is the partial pressure of the dry air, $P_y$ is the partial pressure of the helium, $x$ is the volumetric fraction of the dry air, and $y$ is the volumetric fraction of the helium.

Figure 1:
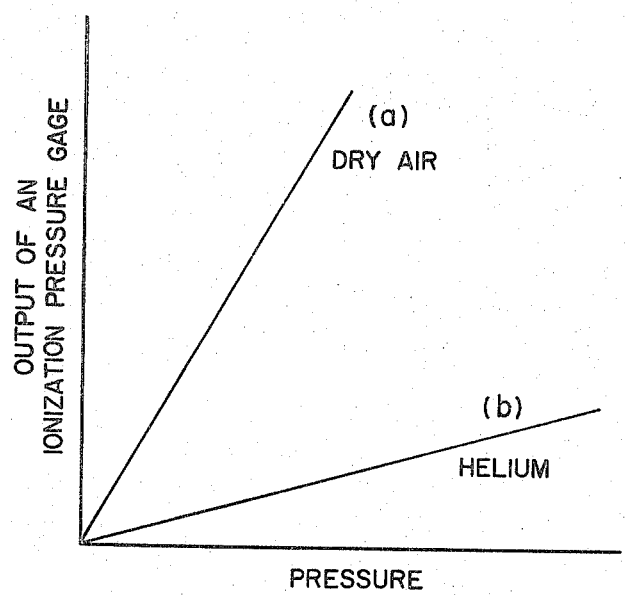
FIG. 1 shows graphs of the output of an ionization pressure gage versus pressure for one hundred percent volumes of both dry air and helium.

If the pressure of a volume of one hundred percent dry air were measured by an ionization pressure gage, and if the outputs $O_x$ of the gage were plotted against changes in pressure of the volume, the straight line graph (a) in FIG. 1 would be obtained. This graph indicates that the output of the ionization pressure gage varies linearly with changes in pressure of a volume of dry air. If the pressure of a volume of one hundred percent helium were measured by the ionization pressure gage, and if the outputs of the gage were plotted against changes in pressure of the volume, the straight line graph (b) in FIG. 1 would be obtained. This graph indicates that the output of the ionization pressure gage varies linearly with changes in pressure of a volume of helium. The two graphs (a) and (b) together indicate that the ionization pressure gage is more sensitive to dry air than it is to helium. That is, the slope of graph (a) is greater than the slope of graph (b). This slope or sensitivity of the ionization pressure gage to dry air will be represented by $S_x$, and this slope or sensitivity of the ionization pressure gage to helium will be represented by $S_y$. Then if the ionization pressure gage is used to measure the pressure of a volume of a mixture of dry air and helium, the output $O_a$ of the gage will be $$O_a = S_x P_x + S_y P_y \qquad (3)$$

substituting Equation 2 into Equation 3

$$O_a = (xS_x + yS_y)P_t \qquad (4)$$

dividing by $O_x$, $$\frac{O_a}{O_x} = \frac{(xS_x + yS_y)P_t}{O_x} \qquad (5)$$

but by definition, when $P_x = P_t$, $$O_x = S_x P_t$$

thus Equation 5 becomes $$\frac{O_a}{O_x} = \frac{xS_x + yS_y}{S_x} \qquad (6)$$

and $$\frac{O_a}{O_x} = x + y\frac{S_y}{S_x}$$

ut in a bi-gaseous mixture $x+y=1$, therefore, $$\frac{O_a}{O_x}=1-y+y\frac{S_y}{S_x} \quad (7)$$

or $$y=\frac{1-\dfrac{O_a}{O_x}}{1-\dfrac{S_y}{S_x}} \quad (8)$$

Since $S_y/S_x$ is constant, Equation 8 gives the volumetric fraction of helium $y$ as a linear function of $O_a/O_x$. Therefore, the ratio of the ionization pressure gage output for the mixture to the ionization pressure gage output for the volume of one hundred percent dry air is proportional to the volumetric fraction of helium in the mixture.

From the theory discussed above, it is obvious that if an ionization pressure gage were used to measure a sample of a helium-dry air mixture, the output of the gage would be proportional to $O_a$. And if a pressure gage that is not sensitive to gas composition were used to measure the pressure of the sample of helium-dry air mixture, the gage could be calibrated to produce an output equal to $O_x$.

The pressure gage that is not sensitive to gas composition can be calibrated to produce an output equal to $O_x$ by varying its sensitivity while measuring a volume of one hundred percent dry air, until it coincides with graph (a) in FIG. 1. Then it is obvious from Equation 8 above that if the two gages are used to measure the pressure of a helium-dry air mixture and if a ratio meter is used to indicate the ratio of the output of the ionization pressure gage to the output of the pressure gage that is not gas-composition sensitive, the output of the ratio meter will indicate the volumetric fraction of helium in the mixture.

Figure 3:
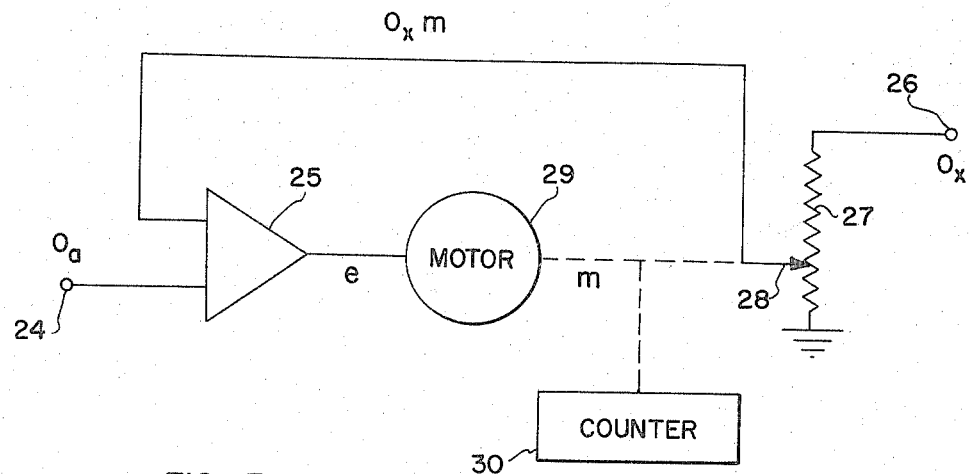
FIG. 3 is a block diagram of a ratio meter suitable for use in the block diagram of FIG. 1.

In describing the preferred embodiment of the invention illustrated in FIGS. 2 and 3 of the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention illustrated in FIG. 2, the number 11 designates the test facility which contains the bi-gaseous mixture, helium-dry air, that is to be analyzed. A tube 12 connects test facility 11 to a manifold 13. An inlet throttle valve 14 is located in tube 12 between the test facility 11 and the manifold 13. A tube 15 connects manifold 13 to a mechanical vacuum pump 16. An outlet throttle valve 17 is located in tube 15 between manifold 13 and mechanical vacuum pump 16. When valves 14 and 17 are both open, vacuum pump 16 pumps the bi-gaseous mixture through manifold 13. The purpose of manifold 13 is to provide a momentary reduction in flow velocity of the bi-gaseous mixture pumped through the manifold. Inlet and outlet throttle valves 14 and 17 are provided to maintain the pressure in manifold 13 within the operating ranges of an ionization pressure gage 18 and a diaphragm pressure gage 19.

The ionization pressure gage 18 is attached to manifold 13. Any ionization pressure gage can be used as gage 18 without departing from the scope or spirit of this invention. That is, any pressure gage that is gas-composition sensitive could be used as gage 18. However, in the preferred embodiment of this invention the "Alphatron" ionization gage is used. The "Alphatron" ionization gage is disclosed on pages 89–93 of the 1959 Sixth National Symposium on Vacuum Technology Transactions; A Multi-Point Vacuum Maneuvering System for Low Pressure Wind Tunnels, by P. L. Vitkus. The "Alphatron" replaces the filament found in the more usual ionization gages with a small radium 226 source. Alpha particles emitted from this source ionize the gas molecules, which are collected on a charged plate, and produce an ionization current of $10^{-11}$ to $10^{-13}$ amperes. Elimination of the filament makes the "Alphatron" particularly suited to this application, as the gage may be subjected to atmospheric pressure without danger of burn-out.

The ionization pressure gage 18 includes a control means, such as a potentiometer, for insuring that the output of gage 18 will be within some desired range. The output of gage 18 is applied through a D.C. amplifier 20 to a ratio meter 21.

The diaphragm pressure gage 19 is attached to manifold 13. Any pressure gage that is not gas-composition sensitive could be used as gage 19. Gage 19 is calibrated so that its output varies with pressure in accordance with graph (a) in FIG. 1. That is, gage 19 is calibrated to produce an output equal to $O_x$. The gage which has been used as gage 19 consists of strain gages forming a four-arm Wheatstone bridge and is actuated by a thin diaphragm. As the pressure changes, the diaphragm is deformed placing the bridge in a state of unbalance which results in an electrical output. Gage 19 includes a control means, such as a voltage divider, for insuring that the output of gage 19 will be within some desired range. The output of gage 19 is applied through a D.C. amplifier 22 to ratio meter 21. The purpose of D.C. amplifiers 20 and 22 are to equalize the ranges of the voltages applied to ratio meter 21, and to provide sufficiently high levels of amplification to realize optimum performance and to minimize interference.

The ratio meter 21 can be any well known device which will produce either a digital or analog output at an output terminal 23 proportional to the ratio of the output of amplifier 20 to the output of amplifier 22. The output of ratio meter 21 is proportional to the volumetric fraction of helium in the helium-dry air mixture.

The ratio meter that has been used as ratio meter 21 is shown in FIG. 3. The output of amplifier 20 is applied through a terminal 24 to a servoamplifier 25; and the output of amplifier 22 is applied through a terminal 26 to a potentiometer 27. The slide 28 of potentiometer 27 is electrically connected to servoamplifier 25. The output of servoamplifier 25 is applied to a motor 29. The shaft of motor is connected to slide 28 and to a counter 30. With $O_a$ applied to terminal 24 and $O_x$ applied to terminal 26, the shaft of motor will turn a number of revolutions proportional to $m$. The voltage at slide 28 will then be proportional to $kO_xm$, where $k$ is some constant. This voltage is subtracted from $O_a$ by servoamplifier 25 to produce an error voltage $e$, that is:

$$O_a-kO_xm=e$$

The gain of servoamplifier 25 is high; therefore, the error signal $e$ will approach zero. Thus, $$O_a-kO_xm=o$$

$$m=\frac{O_a}{kO_x}$$

This means that the number of revolutions of the shaft of motor 29 is proportional to $O_a/O_x$ and from Equation 8 the number of revolutions of the shaft is proportional to the volumetric fraction of helium in the bi-gaseous mixture. A counter 30 is linked to the shaft of motor 29 to give a display of $O_a/O_x$.

The operation of the preferred embodiment of this invention will be described while referring to FIG. 2. Valves 14 and 17 are opened to allow mechanical vacuum pump 16 to pump the helium-dry air mixture in test facility 11 through manifold 13. Valves 14 and 17 are adjusted to maintain the pressure in manifold 13 within the operating ranges of gages 18 and 19. The outputs of gages 18 and 19 are applied through amplifiers 20 and 22 to ratio meter 21. The output of ratio meter 21 is proportional to the volumetric fraction of helium in the helium-dry air mixture in test facility 11.

The advantages of the analyzer which constitute this invention are numerous and it is especially adapted for use in test facilities whose operating costs do not permit extremely long runs, and whose test conditions do not require extreme accuracies. This analyzer is simple and inexpensive, and therefore can be used at many different sample points. It is not affected by changes in pressure of the mixture being analyzed. Even though the analyzer has been disclosed by using a helium-dry air mixture as the bi-gaseous mixture to be analyzed, the analyzer is capable of analyzing any bi-gaseous mixture in which the two gases have a sufficient difference in relative ionization. Optimum sensitivity by the analyzer is obtained when the gases in the bi-gaseous mixture have a large difference in relative ionizations. If either of the gages 18 or 19 has a non-linear output, accurate results may still be obtained by matching the mean slopes of their calibration curves over a reduced pressure range.

It is to be understood that the form of the invention herewith shown and described is to be taken as a preferred embodiment. Various changes may be made in shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims. Analyzers constructed in accordance with this invention can use different ionization pressure gages, diaphragm pressure gages, or ratio meters than those described in this specification. Accordingly, it is to be understood that when these terms are used in the subjoined claims they cover any equivalent devices used in place of these devices.

What is claimed is:

1. An analyzer for measuring the volumetric fraction of one of the gases in a bi-gaseous mixture comprising: ionization pressure gage means which is sensitive to the gas composition of said bi-gaseous mixture for producing a first output proportional to the pressure of said bi-gaseous mixture; pressure gage means, which is calibrated to equal the output of said ionization pressure gage when measuring a one hundred percent volume of the other gas in said bi-gaseous mixture, for producing a second output proportional to the pressure of said bi-gaseous mixture; and means receiving said first and second outputs for producing a third output proportional to said first output divided by said second output whereby said third output is indicative of the volumetric fraction of said one of the gases in said bi-gaseous mixture.

2. An analyzer for measuring the volumetric fraction of one of the gases in a bi-gaseous mixture comprising: ionization pressure gage means which is sensitive to the gas composition of said bi-gaseous mixture for producing an output proportional to the pressure of said bi-gaseous mixture; second pressure gage means, which is calibrated to equal the output of said ionization pressure gage when measuring a one hundred percent volume of the other gas in said bi-gaseous mixture, for producing an output proportional to the pressure of said bi-gaseous mixture; and means receiving the outputs from said ionization and second pressure gage means for producing an output indicative of the volumetric fraction of said one of the gases in said bi-gaseous mixture.

3. An analyzer for measuring the volumetric fraction of one of the gases in a bi-gaseous mixture comprising: ionization pressure gage means which is sensitive to the gas composition of said bi-gaseous mixture for producing an electircal output proportional to the pressure of said bi-gaseous mixture; pressure gage means which is not sensitive to the gas composition of said bi-gaseous mixture and which is calibrated to equal the output of said ionization pressure gage when measuring a one hundred percent volume of the other gas in said bi-gaseous mixture, for producing an electrical output proportional to the pressure of said bi-gaseous mixture; and a ratio meter for measuring the ratio of the electrical output produced by said ionization pressure gage means to the electrical output produced by said pressure gage means whereby said ratio meter measurement indicates the volumetric fraction of one of the gases in said bi-gaseous mixture.

4. An analyzer for measuring the volumetric fraction of a first gas in a bi-gaseous mixture consisting of the first gas and a second gas comprising: ionization pressure gage means which is sensitive to the gas composition of said bi-gaseous mixture for producing an electrical output proportional to the pressure of said bi-gaseous mixture; pressure gage means, which is not sensitive to the gas composition of said bi-gaseous mixture and which is calibrated to produce the same output as said ionization pressure gage would produce if it were used to measure the pressure of a one hundred percent volume of said second gas, for producing an electrical output proportional to the pressure of said bi-gaseous mixture, and a ratio meter for measuring the ratio of the output from said ionization pressure gage means to the output from said pressure gage means whereby said ratio meter measurement indicates the volumetric fraction of said first gas in said bi-gaseous mixture.

5. An analyzer as claimed in claim 4 wherein said pressure gage means is a diaphragm gage.

6. An analyzer for measuring the volumetric fraction of one of the gases in a bi-gaseous mixture comprising: means for isolating a volume of the bi-gaseous mixture as a sample; ionization pressure gage means which is sensitive to the gas composition of said bi-gaseous mixture for producing an electrical output proportional to the pressure of said sample; pressure gage means which is not sensitive to the gas composition of said bi-gaseous mixture and which is calibrated to equal the output of said ionization pressure gage means for a particular mixture of said bi-gaseous mixture for producing an electrical output proportional to the pressure of said sample; and a ratio meter for measuring the ratio of the output of said ionization pressure gage means to the output of said pressure gage means whereby said ratio meter measurement indicates the volumetric fraction of said one of the gases in said bi-gaseous mixture.

7. An analyzer as claimed in claim 6 wherein said means for isolating a volume of the bi-gaseous mixture as a sample includes means for changing the pressure of said sample whereby the pressure of said sample can always be made to be within the ranges of said ionization pressure gage and said pressure gage.

8. An analyzer as claimed in claim 6 wherein said means for isolating a volume of the bi-gaseous mixture as a sample includes means for momentarily reducing the flow velocity of the mixture.

9. An analyzer as claimed in claim 6 wherein said means for isolating a volume of the bi-gaseous mixture as a sample comprises: a first tube connecting the supply of said bi-gaseous mixture to a manifold; a second tube connecting said manifold to a mechanical vacuum pump; a first valve connected in said first tube; and, a second valve connected in said second tube whereby when said mechanical vacuum pump is pumping and said first and second valves are open, a sample of said bi-gaseous mixture will be pumped through said manifold and the pressure of said sample can be varied by adjusting said first and second valves.

10. An analyzer as claimed in claim 6 wherein said ratio meter comprises a dividing circuit whose output is the revolutions of the shaft of a motor, and a counter connected to said shaft to count the number of revolutions made by the shaft.

References Cited by the Examiner

UNITED STATES PATENTS

| 2,787,903 | 4/1957 | Beard | 73—23 |
| 2,830,453 | 4/1958 | Jones | 73—360 |
| 2,882,212 | 4/1959 | Beard | 73—23 |

RICHARD C. QUEISSER, *Primary Examiner.*

J. C. GOLDSTEIN, *Assistant Examiner.*